United States Patent [19]
Goodman

[11] Patent Number: 5,594,779
[45] Date of Patent: Jan. 14, 1997

[54] MOBILE AUDIO PROGRAM SELECTION SYSTEM USING PUBLIC SWITCHED TELEPHONE NETWORK

[75] Inventor: William Goodman, Collegeville, Pa.

[73] Assignee: Bell Atlantic, Arlington, Va.

[21] Appl. No.: 371,902

[22] Filed: Jan. 12, 1995

[51] Int. Cl.$^6$ ............................................. H04Q 2/22
[52] U.S. Cl. ................................ 379/59; 379/58; 379/63; 455/54.2
[58] Field of Search .................................. 379/58, 59, 63, 379/67, 88, 93, 207; 455/33.1, 54.2; 348/12–14

[56] References Cited

U.S. PATENT DOCUMENTS

| | | |
|---|---|---|
| 4,124,773 | 11/1978 | Elkins . |
| 4,481,382 | 11/1984 | Villa-Real . |
| 4,577,067 | 3/1986 | Levy et al. . |
| 4,812,843 | 3/1989 | Champion, III et al. . |
| 4,849,811 | 7/1989 | Kleinerman . |
| 4,922,518 | 5/1990 | Gordon et al. . |
| 4,932,046 | 6/1990 | Katz et al. . |
| 4,954,958 | 9/1990 | Savage et al. . |
| 5,010,399 | 4/1991 | Goodman . |
| 5,105,197 | 4/1992 | Clagett . |
| 5,131,020 | 7/1992 | Liebesny et al. . |
| 5,148,471 | 9/1992 | Metroka et al. . |
| 5,206,641 | 4/1993 | Grant et al. . |
| 5,218,629 | 6/1993 | Dumond, Jr. et al. . |
| 5,222,120 | 6/1993 | McLeod et al. . |
| 5,243,640 | 9/1993 | Hadley et al. ............... 379/59 |
| 5,247,347 | 9/1993 | Litteral et al. . |
| 5,353,331 | 10/1994 | Emery et al. . |
| 5,440,336 | 8/1995 | Buhro et al. ............... 348/13 |

FOREIGN PATENT DOCUMENTS 2216319  10/1989  United Kingdom .

*Primary Examiner*—Dwayne D. Bost
*Attorney, Agent, or Firm*—Lowe, Price, LeBlanc & Becker

[57] ABSTRACT

A mobile audio program selection system includes a radio frequency based information distribution system having mobile users. The distribution system includes a mobile switching office selectively connecting the mobile users of the information distribution system, and information service providers, operatively connected to the mobile switching office, at least one of the information service providers receiving user selection signal inputs received by the mobile switching office from a mobile user, and transmitting user selected information to the mobile switching office responsive to the user selection signal inputs. In addition, the distribution system includes at least one mobile terminal. The mobile terminal includes a receiver, operatively coupling the mobile terminal to the mobile switching office, and receiving the user selected information from the at least one of the information service providers via the mobile switching office. The mobile terminal also includes a control processor controlling operations of the at least one mobile terminal, and a transceiver for receiving a user selection from the mobile user, for generating user selection signal inputs responsive to the user selection, and for transmitting the user selection signal inputs to the mobile switching office. The mobile terminal further operable for formatting the user selected information for broadcasting, for outputting formatted user selected information, and operable for broadcasting the formatted user selected information.

22 Claims, 8 Drawing Sheets

MOBILE AUDIO PROGRAM SELECTION SYSTEM USING PUBLIC SWITCHED TELEPHONE NETWORK

BACKGROUND OF THE INVENTION

1. Technical Field

The present invention relates to a mobile audio program selection system for receiving audio programming to subscribers over a Public Switched Telephone Network (PSTN), and more particularly to an audio program selection system architecture for selecting and receiving audio programming from an information providers using a mobile or cellular telephone or transceiver system.

2. Background Art

Distribution of audio information or data has evolved from early radio broadcasting to meet viewer demand. Initially, radio receivers were bulky and essentially non-movable units which were located in the living room of a home, as a permanent fixture. The radio receiver has been significantly improved over the years to become more portable and convenient. For example, today most vehicles include radios receivers which broadcast prescheduled audio programming to the passengers of the vehicle. In addition, the radio receiver has been reduced to such a small size that many people keep such a portable device on their person while walking or exercising to enhance activities which were commonly performed without the convenience or entertainment of the radio receiver.

However, audio programming was, at best, prescheduled and typically randomized, with the listener having to tune to the designated station or frequency at the appointed time to listen to a particular audio program. Thus, audio listeners were subjected to the selection chosen by the particular broadcast station.

Technological advances resulted in the proliferation of Audio Cassette Recorders (ACR) and Video Cassette Recorders (VCR), establishing a second option for audio and video programming distribution. Pre-recorded audio and video programs are now available for sale and rental to ACR and VCR owners. Using an ACR or VCR, the viewer selects from among many titles available for sale and rental, and listens and perhaps views the program when convenient. The ACR or VCR owner further has the capability to selectively listen or view the programming using special functions of the ACR or VCR, such as pause, fast forward, reverse, slow motion, etc. The listener or viewer can thus manipulate and replay portions of the program at will.

The penalty for this convenience, however, is in the necessity to travel to the local rental/sales store, if necessary wait for a popular program tape to become available, and once the program is purchased or rented to return home to listen to the program. If the tape is rented, the listener then revisits the video store to return the tape.

Much research has been conducted in the unrelated arena of cable television network programming. For example, cable television systems have developed and distributed "premium" channels viewable only by subscribers having appropriate descramblers. The descramblers are tuned to receive these premium channels, descramble the video and audio information and supply a signal capable of reception on a standard television set.

Pay-per-view programs, which evolved later, include recently released movies, live concerts and popular sporting events. Subscribers wishing to view a pay-per-view program place an order with the cable operator. At the designated time, the subscriber's descrambler is activated to permit viewing of the pay-per-view programming. However, the subscriber is restricted to viewing the programming at the scheduled time. There is no capability of delivering programming, video or audio, to a subscriber on demand, that is, immediately or at a subscriber-specified time and date. Further, these cable television systems provide the requested pay-per-view program at a stationary television with a stationary converter descrambler using stationary land lines.

Telephone lines have been suggested as an alternative means of video distribution in Goodman et al., 5,010,399 and Kleinerman, 4,849,811. However, systems using the public switched telephone network (PSTN) are often bandwidth limited, providing only still frame or video conferencing capabilities. Because telephone system carriers for the most part use the PSTN only for connectivity between subscribers, there is no capability for dynamic routing of digitized video without dedicated leased, wide bandwidth circuits. Telephone line based systems also fail to provide acceptable VCR type functional control of the programming.

U.S. Pat. No. 5,247,347, to Litteral et al., incorporated herein by reference, describes a so-called Video-on-Demand service that provides video programming to subscribers over the PSTN. A video information provider (VIP) transmits coded digital video data over wideband PSTN supplied connectivity to a central office. The video data may be buffered at the central office for transmission over a POTS line to the subscriber. A subscriber may use either a standard telephone instrument over the PSTN or a dedicated control device over an ISDN packet network to order the video programming. Such a device is located at a television set of the subscriber and permits a display of the program menu on the television screen.

Connectivity between the central office and the subscriber for transmission of video data is provided by an asymmetrical digital subscriber line (ADSL) system. ADSL interface units perform multiplexing of digital video information with voice information to be transmitted to the subscriber and support transmission on the ISDN packet data network of a reverse control channel from the subscriber to the central office.

However, all these prior art attempts have concentrated on video-on-demand programming which is tied to the public switched telephone network using stationary converted or digital subscriber devices located at a fixed location, such as the home.

U.S. Pat. No. 5,131,020 to Liebensy et al. describes a Method of and System for Providing Continually Updated Traffic or Other Information to Telephonically and Other Communications-Linked Customers. This patent pertains to a method of traffic information and telephone channel communication between a central station and a plurality of callers distributed in different zones throughout a geographical area. All callers are telephonically linked with the central station. The method collects and updates traffic information from a plurality of sources on a real-time and continual basis for all the zones throughout the area. It responds to telephone dialing on the caller's telephone keyboard and enters on such keyboard a code for the particular zone of interest specified by the caller. It telephonically transmits back from the central station to the caller a report of the traffic information requested by the caller in the particular zone specified by the caller. It also responds to subsequent caller keyboard requests for automatic updating of significant changes in the traffic information within such specific zone.

U.S. Pat. No. 5,243,640 to Hadley et al. relates to an Integrated Cellular Telephone and Vehicular Audio System. The patent pertains to interfacing a mobile telephone and an audio system in a vehicle. The patent integrates the two systems in order to share components and thereby eliminate duplication costs and complexity of the system. The system selectively couples program audio signals and phone audio signals to an output transducer depending on the activation of a main program audio system and telephone.

U.S. Pat. No. 5,206,641 to Grant et al. involves a Portable Traffic Congestion Radio. The patent pertains to a portable electronic storage device that receives and stores digitally coded traffic reports for a covered geographical area. The device presents traffic information relevant to a user-specified vehicle trip within the covered area. The device includes a touch-sensitive map that is used to indicate trip origin, destination and routing of interest. The device makes calculations to select and modify the reports and the traffic information from the reports is presented to the user by synthesized or digitized voice sounds.

U.S. Pat. No. 4,812,843 to Champion et al. relates to a Telephone Accessible Information System. The patent describes a communication system for subscribers that is capable of continuously updating information on a variety of subjects. Primarily, the patent deals with the subject of updated traffic information. Each geographic area served by the system is represented by a specially designed map. The map is divided into grid sections and systems to indicate routes. The subscriber, through codes on a DTMF phone selects a particular route. The communications system, from information gathered in a database, provides the subscriber with updated traffic information. This is continually updated for a certain route for a certain period of time.

Heretofore, however, the prior art has not addressed the issue or problem relating to the providing of audio data or programs to users which typically receive or listen to audio or substantially audio programs in a moveable or transient manner as discussed previously.

In addition, the prior art has not considered or addressed the problem relating to the selection of audio programs from an audio provider where the audio programs are to be delivered or transmitted to a portable, moveable audio device.

The prior art has further not addressed the problem providing the user of a portable audio device with an economical means of receiving audio programming.

The prior art has also not addressed the problem of efficiently allocating sufficient resources between the audio program provider and the portable audio program listener.

SUMMARY OF THE INVENTION

It is therefore, a feature and advantage of the present invention to provide audio data or programs to users which typically receive or listen to in a moveable or transient manner. An integral part of this feature and advantage of the present invention is that we have discovered that portable audio listeners have much different requirements than the typical video-on-demand systems. Accordingly, the present invention incorporates the considerations of the audio listeners in the overall architecture of the mobile audio program selection system of the present invention.

Another feature and advantage of the present invention is to provide the listener with audio program selection from an audio provider where the audio programs are to be delivered or transmitted to a portable, moveable audio device.

Another feature and advantage of the present invention is to provide the user of a portable audio device with an economical means of receiving audio programming.

Yet another feature and advantage of the present invention is to efficiently allocate sufficient resources between the audio program provider and the portable audio program listener.

To achieve these features and advantages, the present invention provides a mobile audio program selection system. In one of the preferred embodiments, the mobile audio program selection system includes a radio frequency based information distribution system having mobile users. The distribution system includes a mobile switching office selectively connecting the mobile users of the information distribution system, and information service providers, operatively connected to the mobile switching office, at least one of the information service providers receiving user selection signal inputs received by the mobile switching office from a mobile user, and transmitting user selected information to the mobile switching office responsive to the user selection signal inputs. In addition, the distribution system includes at least one mobile terminal. The mobile terminal includes a receiver, operatively coupling the mobile terminal to the mobile switching office, and receiving the user selected information from the at least one of the information service providers via the mobile switching office. The mobile terminal also includes a control processor controlling operations of the at least one mobile terminal, and means for receiving a user selection from the mobile user, for generating user selection signal inputs responsive to the user selection, and for transmitting the user selection signal inputs to the mobile switching office. The mobile terminal further includes signal format means for formatting the user selected information for broadcasting, and for outputting formatted user selected information, and broadcast means for broadcasting the formatted user selected information.

In addition, the present invention also includes an asymmetrical audio program delivery cellular system having mobile users. The asymmetrical system includes a mobile terminal having a receiver receiving user selected program data signals for broadcasting to a mobile user, a control processor controlling operations of the mobile terminal, and means for receiving a user selection from the mobile user, for generating user selection signal inputs responsive to the user selection, and for transmitting the user selection signal inputs. The mobile terminal further includes signal format means for formatting the user selected information for broadcasting, and broadcast means for broadcasting the formatted user selected information. The asymmetrical system also includes a first mobile switching office receiving the formatted user selected information broadcast by the broadcast means using a first communication channel which operates under a first communication speed, and information service providers, operatively connected to the first mobile switching office. One of the information service providers receives user selection signal inputs received by the first mobile switching office from the mobile user, and transmits one user selected program responsive to the user selection signal inputs. The asymmetrical system further includes a second mobile switching office, operatively connected to at least one of the information service providers, receiving at least one user selected program transmitted by at least one of the information service providers using a second communication channel which operates under a second communication speed. The asymmetrical system is designed so that the second communication speed of the second communications channel of the second mobile switching office is substantially greater than the first communication speed of the first communications channel of the second mobile switching office.

In another embodiment of the present invention, an audio program and voice mail download distribution system having mobile users is provided. The download distribution system includes a mobile switching office selectively connecting the mobile users of the audio program and voice mail download system, and information service providers, operatively connected to the mobile switching office. One of the information service providers receives user selection signal inputs received by the mobile switching office from a mobile user, and transmits user selected information to the mobile switching office responsive to the user selection signal inputs. The download distribution system also includes at least one mobile terminal. The mobile terminal includes a receiver, operatively coupling the at least one mobile terminal to the mobile switching office, receiving the user selected information from the at least one of the information service providers via the mobile switching office, and a control processor controlling operations of the at least one mobile terminal. The mobile terminal also includes means for receiving a user selection from the mobile user, for generating user selection signal inputs responsive to the user selection, and for transmitting the user selection signal inputs to the mobile switching office, and signal format means for formatting the user selected information for broadcasting, and for outputting formatted user selected information. The mobile terminal further includes broadcast means for broadcasting the formatted user selected information, and a memory operatively connected to the receiver. The user selected information comprises at least one of voice mail messages and audio programs. In addition, the receiver receives the user selected information corresponding to the user selection signal inputs and stores the user selected information entirely in the memory before broadcasting to the mobile user, thereby minimizing connection between the mobile terminal and the mobile switching office.

In another embodiment of the present invention, an advanced intelligent network based information distribution system having mobile users is provided. The network based distribution system includes a central office switching system connected to communication lines including at least one service switching point for selectively providing switched communications between the communication lines. In addition, the network based distribution system also includes a mobility controller, connected to the central office switching system, arranged for selectively providing wireless communications between the central office switching system and mobile terminals by using control data conveyed to at least one service switching point through a service transfer point. A network controller is also provided which is arranged for selectively providing control data to effect land line communications, and arranged separately from the central office switching system and the mobility controller. The network controller is connected to both the mobility controller and the service switching point through at least one service transfer point arranged to convey control data to effect communications. The network controller also stores preprogrammed call processing data associated with subscribers who are associated with one of the communication lines connected to the central office switching system and preprogrammed call processing data associated with subscribers who are associated with one of the mobile terminals. The network based distribution system further includes information service providers, operatively connected to the mobility controller, at least one of the information service providers receiving user selection signal inputs received by the mobility controller from a mobile user, and transmitting user selected information to the mobility controller responsive to the user selection signal inputs. At least one mobile terminal is also provided which includes a receiver, operatively coupling the mobile terminal to the mobility controller, receiving the user selected information from the at least one of the information service providers via the mobility controller, and a control processor controlling operations of the at least one mobile terminal. The mobile terminal also includes means for receiving a user selection from the mobile user, for generating user selection signal inputs responsive to the user selection, and for transmitting the user selection signal inputs to the mobility controller. Further, the mobile terminal includes signal format means for formatting the user selected information for broadcasting, and for outputting formatted user selected information, and broadcast means for broadcasting the formatted user selected information.

In another embodiment of the present invention a method is provided in a radio frequency based information distribution system having mobile users. The radio frequency based information distribution system includes a mobile switching office selectively connecting the mobile users of the information distribution system, information service providers, operatively connected to the mobile switching office, at least one of the information service providers transmitting user selected information to the mobile switching office responsive to user selection signal inputs, and at least one mobile terminal including a receiver, operatively coupling the at least one mobile terminal to the mobile switching office, a control processor controlling operations of the at least one mobile terminal, means for receiving a user selection from the mobile user, signal format means for formatting the user selection for broadcasting, and broadcast means for broadcasting the formatted user selected information. The method of distributing radio frequencies to mobile users, includes the steps of:

(a) selectively connecting the mobile users of the information distribution system;

(b) receiving a user selection from at least one of the mobile users, (c) generating user selection signal inputs responsive to the user selection, (d) transmitting the user selection signal inputs to the mobile switching office;

(e) receiving user selection signal inputs received by the mobile switching office from the at least one of the mobile users, and transmitting user selected information to the mobile switching office responsive to the user selection signal inputs via at least one of the information service providers;

(f) receiving the user selected information from the at least one of the information service providers via the mobile switching office in a receiver of the at least one mobile terminal;

(g) controlling operations of the at least one mobile terminal;

(h) formatting the user selected information for broadcasting; and (i) broadcasting the formatted user selected information to the mobile user of the at least one mobile terminal.

These, together with other objects and advantages which will be subsequently apparent, reside in the details of construction and operation as more fully hereinafter described and claimed, with reference being had to the accompanying drawings forming a part hereof, wherein like numerals refer to like elements throughout.

DESCRIPTION OF THE PREFERRED EMBODIMENTS

Figure 1:
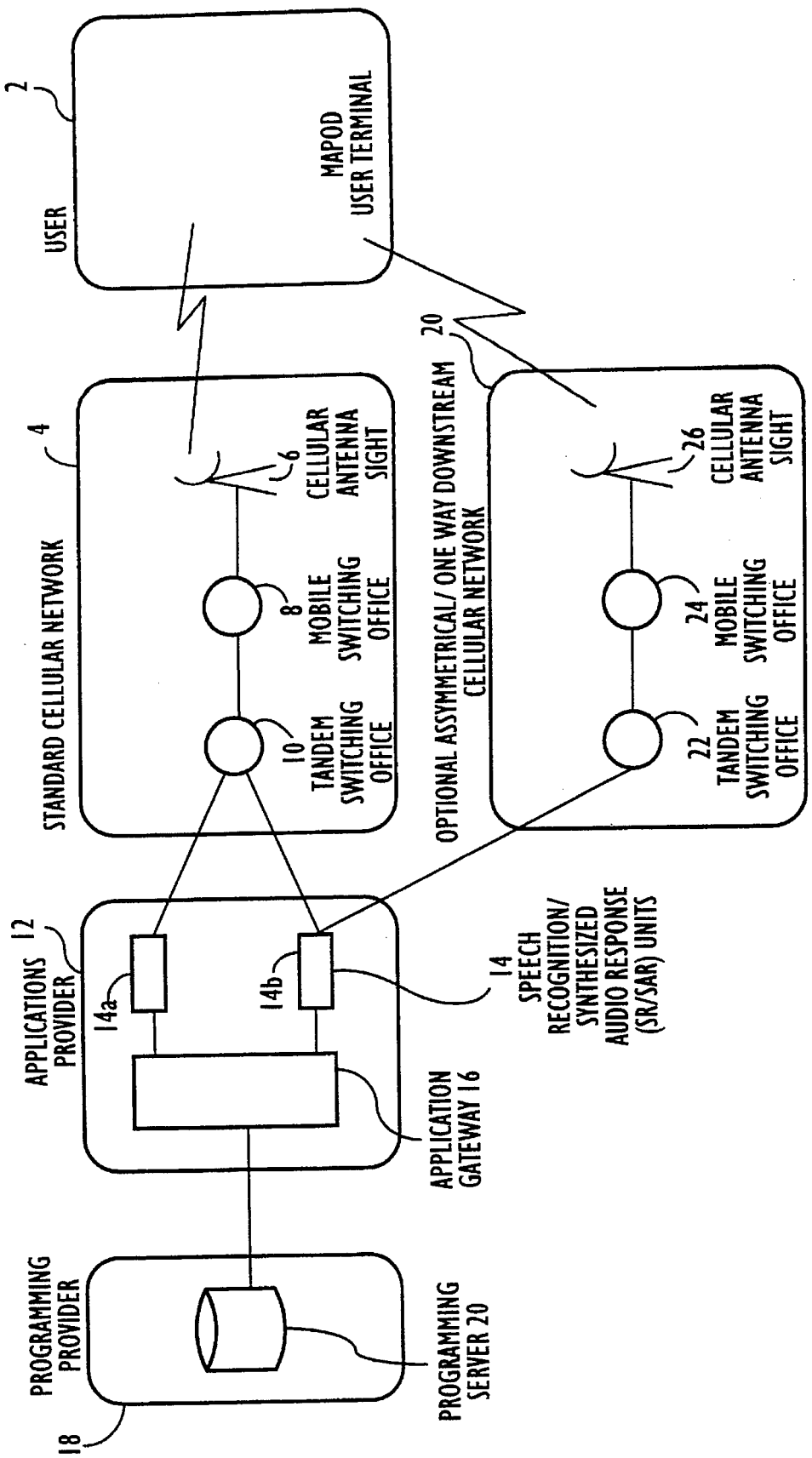
FIG. 1 is a conceptual diagram of the mobile audio program selection system of the present invention.

FIG. 1 is a conceptual diagram of the mobile audio program selection system of the present invention. In FIG. 1, a Mobile Audio PrOgramming Device (MAPOD) 2 is located in close proximity to a user, e.g., in an automobile or strapped around a user's waist. MAPOD 2 will interface with standard cellular network 4 or an optional asymmetrical/one-way downstream network 20.

The standard protocol which MAPOD 2 uses to interface with standard cellular network 4 or asymmetrical/one-way downstream network 20 is preferably the standard protocol used by cellular telephones. This standard protocol is described in detail, for example, in EIA/TIA publications IS-41.1-A, IS-41.2-A, IS-41.3-A, IS-41.4-A, and IS-41.5-A. Other interface protocol and systems are presented in U.S. Pat. Nos. : 5,371,898; 5,369,681; 5,353,352; 5,353,331; 5,307,400; 5,257,400; 5,251,249; 5,247,698; 5,119,502; 5,119,397; 5,111,534; 5,020,093; 5,020,092; 5,020,091; 5,008,925; 4,972,455; 4,905,301; 4,893,327; 4,799,253; 4,754,495; 4,750,198; 4,599,490, all incorporated herein by reference. A brief summary is presented here as the protocol pertains to the interface between MAPOD 2 and cellular networks 4 and 20.

A typical cellular mobile radio telephone system is controlled by at least one mobile switching center (also known as a mobile telephone switching office), at least one base station, and at least one mobile station. The mobile switching center constitutes an interface between the radio system and the public switching telephone network. The base station transmits information between the mobile stations and the mobile switching centers. Calls to and from mobile subscribers are switched by the mobile switching center.

The mobile switching center also provides all signalling functions needed to establish the calls. In order to obtain radio coverage of a geographical area, a number of base stations are normally required. This number may range from, in the exceptional case, one base station, up to one hundred or more base stations in normal systems. The area is divided into cells, where each cell may either be serviced by a base station or may share a base station with a number of other cells.

Currently, cellular radiotelephone service is provided in the 825 to 845 Mhz and 870 to 890 Mhz frequency bands. The higher-frequency band is used for "down-link" transmissions from the "cell site" for reception by the subscriber. The cell site is the location of the transmitter, or, more specifically, the location of the antenna from which transmissions are effected for the cell. The lower frequency band is used for "up-link" transmissions from the subscriber in the cell for reception by the receiving equipment which is also located at the cell site.

Each frequency band assigned to the cellular radiotelephone system is divided into two groups, with one group being reserved for the local telephone company and the other group being franchised to a completing service provider. Each cellular channel has a thirty kilohertz bandwidth, allowing for 666 sequentially numbered channels, with channels 1 through 333 being allocated to one service provider and channels 334 through 666 being allocated to the other service provider.

Communication between the radio base stations within the system and the mobile stations within the system are divided into a plurality of voice or speech channels and at least one access or control channel, which may be either analog or digital and which may have any data rate. An illustrative one of such access or control channel is referred to as the forward control channel (FOCC).

Each mobile station which is operating within a cellular communications system must be locatable when a call is received by the system which is intended for that station. A mobile station is located by broadcasting a paging signal directed to the mobile and requesting it to respond if it receives the page. When the mobile broadcasts its page response signal to the page signal it is then placed on a voice channel by the base station and the call intended for the mobile can be connected to it through that voice channel. Cellular telecommunications systems employ a control channel such as the forward control channel (FOCC) as the means by which paging signals are broadcast into the various cells of the system in order to locate a particular mobile station.

The control channel, such as the FOCC, is typically restricted to a rate on the order of 8–10 K bits per second which is a speed limitation imposed by the technology used in that implementation. The control channel may also be utilized to transmit other messages to the mobile stations, including, for example, voice channel designations, directed retry orders, system ordered rescan signals and system overhead message trains each of which use substantial control channel capacity each time they are transmitted.

Paging provides the ability to locate a mobile station's whereabouts within the exchange in order to set up a call to that mobile station. More specifically, the paging process in mobile cellular radio systems, attempts to identify the specific cell containing that mobile, as described above in connection with the paging process. During the execution of this process, the mobile switching center (MSC) searches for the mobile by sending a sequence of paging messages on the FOCC of the system and awaits a page response. Obviously, the page message muse be transmitted to all of the cell sites covering the entire service area of the system in order to ensure that the mobile is located regardless of where it might be within the system.

In present systems, when a page remains unanswered by the mobile station which is sought, the page must be repeated. This repetition can be either within a location area previously paged or within the entire service area (SA) of the system. The present practice within cellular radio systems is to employ the paging process to handle incoming page requests on a "first come, first served" basis. Depending upon whether the location area (LA) of the requested mobile station is known or not, the amount of paging capacity allocated to serve a particular page request is the same. That is, if the LA of the mobile station is known, then the first page attempt is within the LA. Otherwise, the page attempt is within the service area (SA) which includes all of the LA's within the exchange. If no response is received to the page, the page is repeated either within the LA itself or within the SA.

When attempting to route a call to a mobile station, the MSC must specifically know in which cell the mobile station is located. In accomplishing the task of locating the mobile, the MSC pages the mobile station in the location area where the mobile station last registered. This prevents a global or system-wide page wherein all the cells within an exchange are paged simultaneously. If the mobile station does not answer the page request in the registered location area of its last registration, only then is service area or global paging required in order to locate the mobile.

A known solution to the problem of locating the mobile phone is based on the concept of mobile registration. Mobile registration is the process by which a mobile phone becomes listed as being present in the service area of one of the mobile exchanges in a mobile telephone service network. It should be recognized that one purpose of mobile registration is to permit calls to a mobile phone to be automatically delivered even though the mobile phone may be moving from place to place through a network of cellular systems.

It should also be recognized that mobile phone registration according to EIA Standard IS-3D is effected by means of interactions between the cellular system and the mobile phones operating in its service area. One such interaction is called "autonomous registration" and it is controlled by the cellular system through certain information transmitted to the mobile phones. This information is in the form of an overhead message train (OMT), which is transmitted on paging channels throughout a cellular system service area, normally once each second approximately. The OMT includes a system parameter overhead message including station and registration related messages, and optionally, several other messages of which the registration identification message and the registration increment message relate to the autonomous registration process.

Registration may be enabled or disabled individually for each class of mobile phone, e.g., home or roam (explained below), by means of control bits in the system parameter overhead message. The system parameter overhead message also contains the identification number of the serving cellular system from which the mobile phone determines whether it is a "home" or a "roam" mobile phone. Each mobile phone contains, in its internal memory, an entry indicating the identity of its home cellular system and an entry indicating the cellular systems (which may be the home cellular system) in which it has most recently registered successfully. It also stores a value for the cellular system used to determine when it is scheduled to re-register in that cellular system.

In the mobile telephone systems used in North America, the United Kingdom and in other markets, twenty-one frequencies are allocated for the control channels. A two-bit digital color code (DCC) is used to differentiate control channels using the same frequency. It is thus possible to have up to 84 cells, each cell having a control channel with a unique set of frequency and DCC combinations. In densely populated areas, subscriber demand may require more than 84 cells to provide adequate mobile telephone service.

In FIG. 1, standard cellular network 4 interfaces with MAPOD 2, preferably as described above. In particular, cellular antenna 6 receives signals from MAPOD 2, and transmits signals generated by mobile switching office 8. Mobile switching office 8 permits connection between MAPOD 2 and application provider 12 via tandem switching office 10. Application provider 12 permits and facilitates selection of various audio data by the user of MAPOD 2 via speech recognition/synthesized audio response units 14a, 14b which then convert audio commands issued by the user of MAPOD 2 into an audio request. One example of an intelligent voice recognition system is described in commonly assigned application Ser. No. 08/271,887, filed Jul. 7, 1994, entitled "Intelligent Recognition" (attorney docket no. 680-091A), the disclosure of which is incorporated herein entirely by reference. Application gateway 16 coordinates and supervises the audio data requests issued by MAPOD 2 and transmits the audio request to programming provider 18. Programming provider 18 includes programming server 20 which contains the audio data requested by MAPOD 2 and which transmits the audio data back to application provider 12.

Application provider 12 then transmits the audio data to either standard cellular network 4 or to optional asymmetrical cellular network 20 which may be dedicated for transmitting the audio data from application provider 12 to MAPOD 2. Asymmetrical cellular network 20 includes tandem switching office 22 which receives the audio data from application provider 12 and transmits the audio data to MAPOD switching office 24. MAPOD switching office 24 will then transmit the audio data via cellular antenna 26 to MAPOD 2. Since MAPOD switching office 24 is dedicated to transmission of audio data, MAPOD switching office 24 preferably utilizes a higher bit rate channel, for example, having a larger band width capacity, to transmit the audio data to MAPOD 2. Accordingly, the mobile audio program selection system of the present invention utilizes the public switch telephone network (PSTN) in order to receive the audio request by the user of MAPOD 2, and transmits the audio data to MAPOD 2 via either standard cellular network 4 or asymmetrical cellular network 20.

Figure 2:
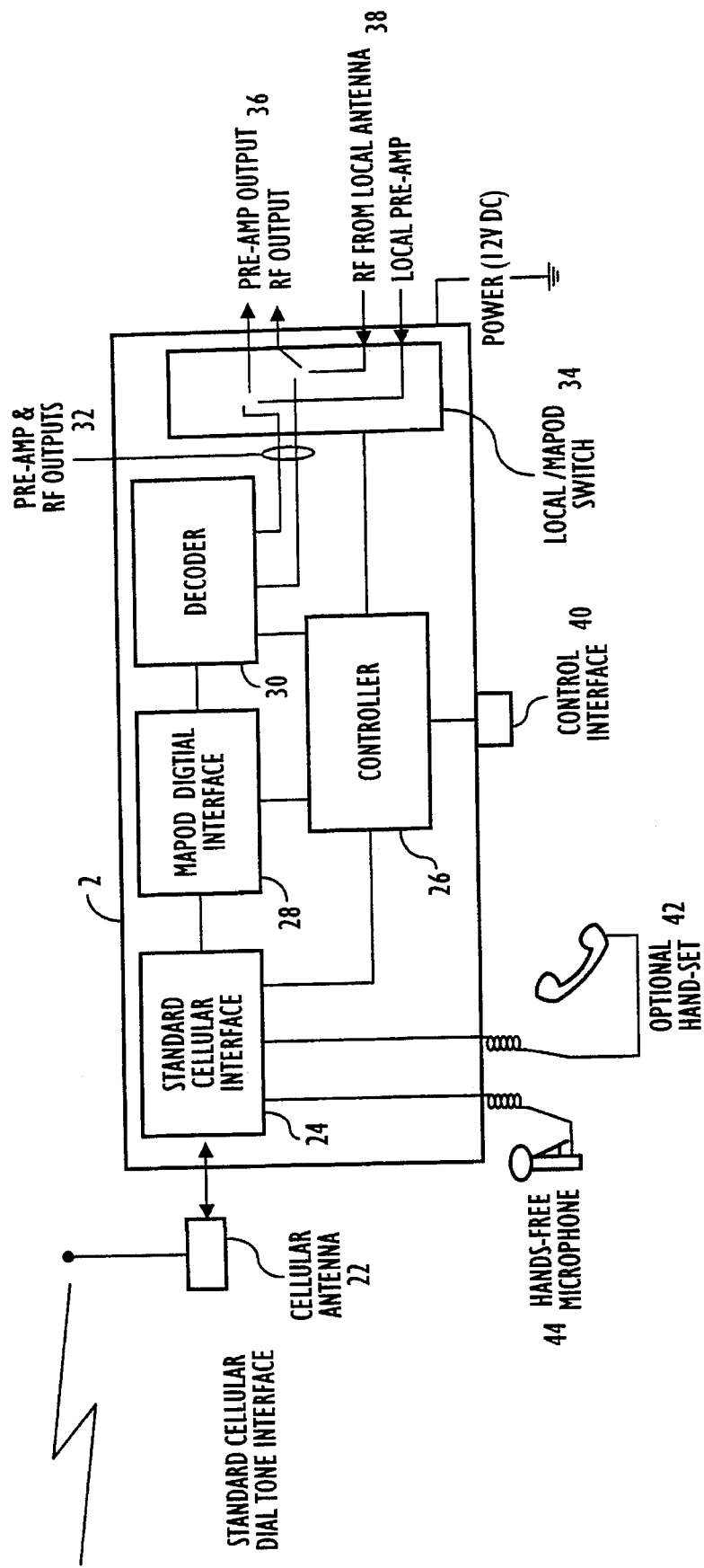
FIG. 2 is a block diagram of the Mobile Audio PrOgram selection Device (MAPOD) of the present invention.

FIG. 2 is a block diagram of the mobile audio program selection device. In FIG. 2, MAPOD 2 receives and transmits signals via cellular antenna 22. Standard cellular interface 24, as described previously, will transmit the audio request via, for example, handset 42 or hands-free microphone 44. In addition, cellular interface 24 receives audio data via cellular antenna 22. Controller 26 coordinates, monitors and controls the broadcasting of audio data received or transmitted via cellular interface 24. Cellular interface 24 then transmits the audio data to MAPOD digital interface 28 which demodulates the data in a standard form for broadcasting to the user. MAPOD digital interface 28 may be, for example, a standard modem which demodulates the received data.

MAPOD digital interface then transmits the demodulated data to decoder 30 which decodes the encoded data in accordance with a predetermined coding scheme. For example, suitable video coding algorithms rely on motion compensated prediction (MCP) and motion compensated interpolation (MCI). Motion compensated predictive/interpolative coding (MCPIC) is described in Wong et al. "NCPIC: A video coding algorithm for transmission and storing applications", November, 1990 IEEE Communications magazine. While the above coding algorithms relate to video data, they may be also utilized with respect to audio data.

Another compression technique using motion estimation, motion compensation predictive coding and adaptive discrete cosine transform quantization is supported by the International Standards Organization (ISO) moving pictures expert group (MPEG). MPEG-1 specifies a coding algorithm having a data rate of 1.2 MBPS. This digital impression standard may be accommodated by a data channel having the capability of 1.544 MBPS. MPEG programmable decoder/processors, capable of decompressing digital data in real time, have been produced by such companies as C-Cube Microsystems and LSI of San Jose, Calif.

Decoder 30 outputs the audio data via standard preamp and RF output conductors 32 to MAPOD switch 34. MAPOD switch 34 which is controlled by controller 26 then outputs the audio data to amplifiers and/or speakers for example, in an automobile or to auxiliary speakers attached to MAPOD 2. Advantageously, MAPOD switch 34 includes the capability of receiving radio frequencies (RF) from a local antenna, and the capability of receiving local preamplified signals as well. Thus, for example, MAPOD switch 34 may be used to either transmit audio data received from a program provider via a cellular network, or audio data received via, for example, a local radio in an automobile or positioned locally with respect to MAPOD 2. MAPOD 2 also includes control interface 40 for programming or specifying specific instructions for controller 26. For example, controller 26 may be programmed to play the audio data received via a cellular network even when audio data is also received simultaneously via a local radio by MAPOD switch 34. In this situation, controller 26 considers the audio data received from the cellular network of a higher priority.

Figure 3:
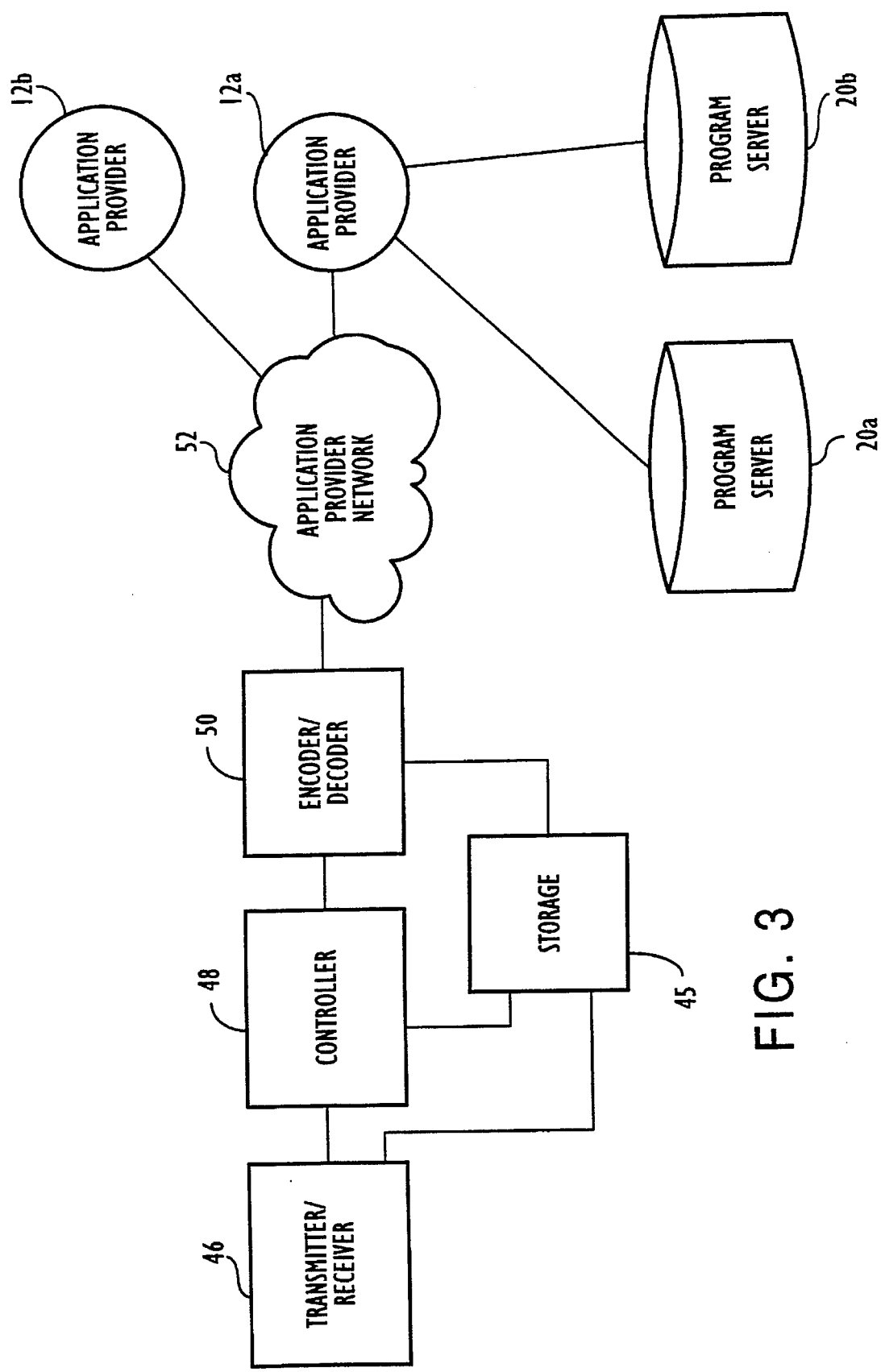
FIG. 3 is a block diagram of the mobile audio program provider of the present invention.

FIG. 3 is a block diagram of the mobile audio program provider system. In FIG. 3, transmitter/receiver (transceiver) 46 is designed to communicate with the transceiver, i.e., standard cellular interface 24, in MAPOD 2. Transmitter/receiver 46 provides connection with the public switch telecommunications network (PSTN) as will be described. Transmitter/receiver 46 is adapted to transmit compressed data to the transceiver in the MAPOD, and to receive compressed digital data transmitted by the MAPOD.

The compressed data received via a receiver section of transmitter/receiver 46 is fed to buffer storage 45 under the control of processor controller 48. The stored signal is then fed to encoder/decoder 50 which decodes the received signal, if needed, into a format which is acceptable for application provider network 52. Application provider network 52 includes switching functions for switching between application providers 12a, 12b. Application provider network 52 preferably includes a conventional message system platform including voice processing functions and storage. Depending upon the address attached by application provider network 52, the audio request may be stored for automatic delivery using conventional call completion services. Once delivered to the appropriate application provider 12a, 12b, an appropriate program server, for example, 20a, 20b is accessed for the requested audio selection. The audio data is then transmitted from the selected program server to the application provider network 52 via the appropriate application provider, and is encoded for transmission to the mobile audio program device 2.

Figure 4:
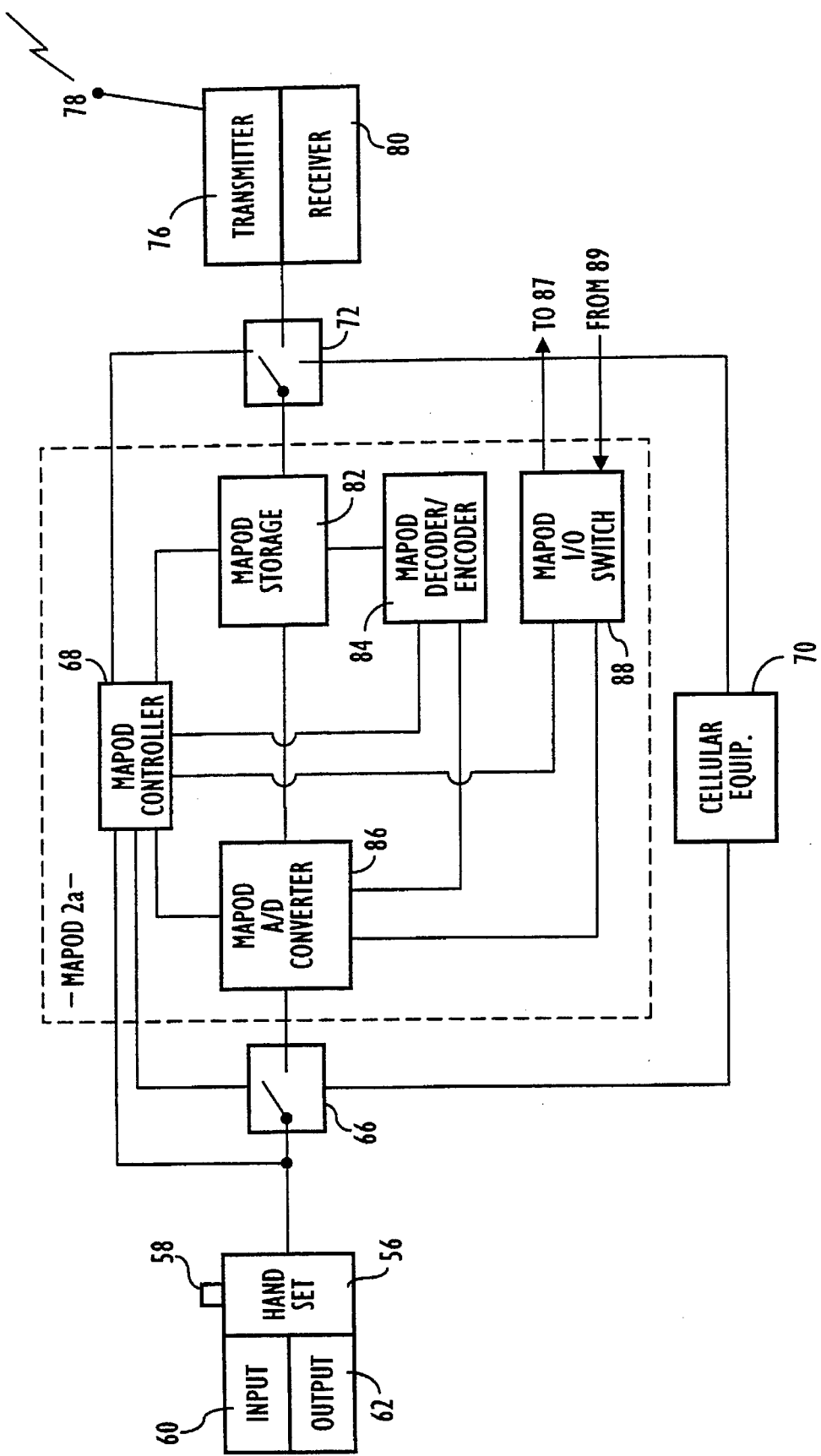
FIG. 4 is a block diagram of another embodiment of the mobile audio program selection device of the present invention.

FIG. 4 is a block diagram of another embodiment of the mobile audio program device which includes standard cellular equipment for voice connections to other parties. In FIG. 4, a portable transceiver device is illustrated which may be installed in an automobile vehicle in a similar manner as a cellular telephone or which may be battery powered and completely portable, as is also common with standard cellular telephones. The portable transceiver device includes hand set 56 which includes a conventional input or a microphone 60, and an output or ear piece 62. Actuation button 58 is provided for a purpose to be described below.

The output of hand set 56 comprises an analog voice signal which is fed to standard cellular equipment 70 via switch 66 under the control of controller 68. The analog voice signal will typically be fed to cellular equipment 70 when controller 68 determines that MAPOD 2a is not being used and a standard cellular telephone call is being performed or when hand set 56 transmits digit data indicating a telephone call is to be initiated by the user. Cellular equipment 70 will then format the analog voice signal or digit data for transmission by transmitter 76 and antenna 78 via switch 72 which is also controlled by controller 68. In this manner, standard cellular telephone calls or telephone calls which are initiated by the user of hand set 56 will be executed by cellular equipment 70.

Receiver 80 will receive a compressed signal either for a standard cellular telephone connection from another party or will receive audio data from an application provider via an application provider network. Switch 72 directs the received information either to standard cellular equipment for standard cellular telephone call or to MAPOD 2a for transmitting of audio data received from an application provider to the MAPOD user. Switch 72 is under the control of controller 68 and may be preset in accordance with, for example, switch activation button 58 of hand set 56, or may be switched in accordance with the content of the signal received by receiver 80 and monitored by controller 68.

When controller 68 determines that the received information is audio data to be formatted and presented to the user of hand set 56, the received information is transmitted to storage 82 and accessed by decoder/encoder 84 for decoding the received compressed data. The decoded data is then transmitted to A/D converter 86 which will convert the decoded data from digital to analog form and transmit the analog converted audio data to either output 62 of hand set 56 or to input/output (I/O) switch 88 which under the control of controller 68. Switch 88 is used to transmit audio data to broadcast devices via output 87, as well as accept radio frequencies from a local antenna at input 89 as discussed previously. When the audio data received from the application provider is a menu listing the various audio selections available to the user, the user may input a selection either by voice via input 60 of hand set 56, or by transmitting digits input via handset 56. This selection information is then transmitted back to the application provider, and based upon the selection, the application provider will arrange to obtain and provide the selected audio data from a program server to the user of MAPOD 2a.

MAPOD 2a advantageously includes the capability of receiving large amounts of data which are downloaded from the application provider for the selected audio program. Specifically, MAPOD 2a may either transmit the audio data received from the application provider in real-time to the MAPOD user, or MAPOD 2a may receive all the audio data via a high data rate channel and store the compressed information in storage 82. The compressed audio data may then be retrieved and decoded by decoder/encoder 84, and transmitted to the MAPOD user at a pre-selected time. Once the audio program is downloaded to MAPOD 2a and stored in storage 82, MAPOD 2a includes the additional feature of severing the connection between MAPOD 2a and the application provider in order to minimize the amount of cellular connection, and the amount of cost which is charged to the user of MAPOD 2a.

Additionally, MAPOD 2a may be located within, for example, a stereo system or radio which will receive the audio data from the application provider directly, and broadcast the audio data on associated speakers with the stereo system. In this instance, hand set 56 would be used to order or select the audio data from the application provider via standard cellular equipment, and the application provider would communicate directly with MAPOD 2a once the selection has been made for the broadcasting of the audio data. Similarly, MAPOD 2a may be used in conjunction with a voice mail system where the user of MAPOD 2a will have their voice messages downloaded from a voice mail system using a high data rate channel, and which are later broadcasted for the user. According to this scenario, the user of MAPOD 2a will minimize the cellular connection with the voice mail system and may have their messages broadcasted at a later time, or repeatedly without incurring substantial cellular telephone connection charges which would otherwise be experienced.

Figure 5:
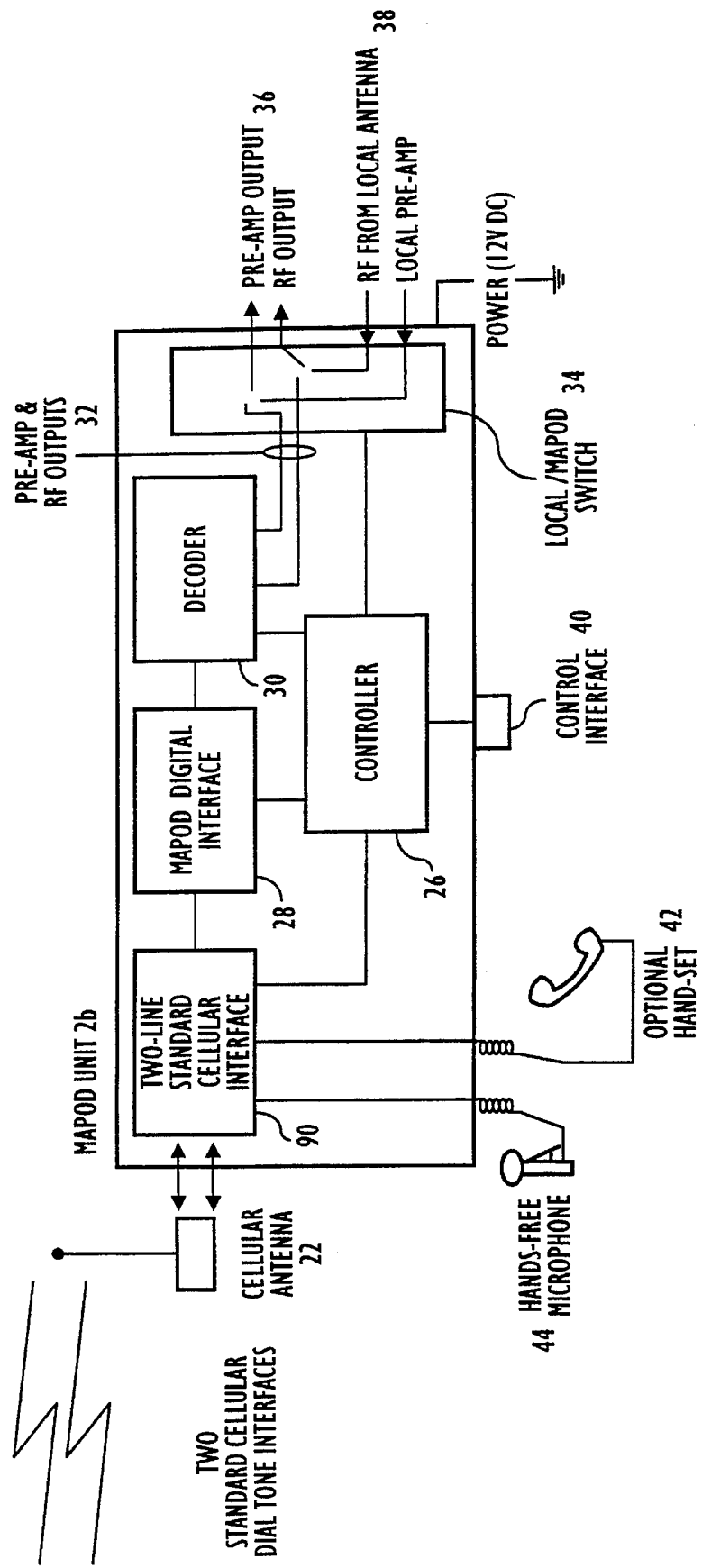
FIG. 5 is a block diagram of another embodiment of the mobile audio program selection device of the present invention.

FIG. 5 is a block diagram of another embodiment of the mobile audio program selection device of the present invention. In FIG. 5, the elements designated by the reference numerals which are identical to FIG. 2 perform the similar function, and therefore, will not be discussed in detail. In FIG. 5, MAPOD unit 2b includes, instead of a standard cellular interface 24, a two line standard cellular interface 90 which permits simultaneous voice connection between the MAPOD user and another party as well as an additional line which would permit the connection between a MAPOD user and the application provider network or another party. Two line cellular interface 90 is standard and will not be discussed here in detail.

Figure 6:
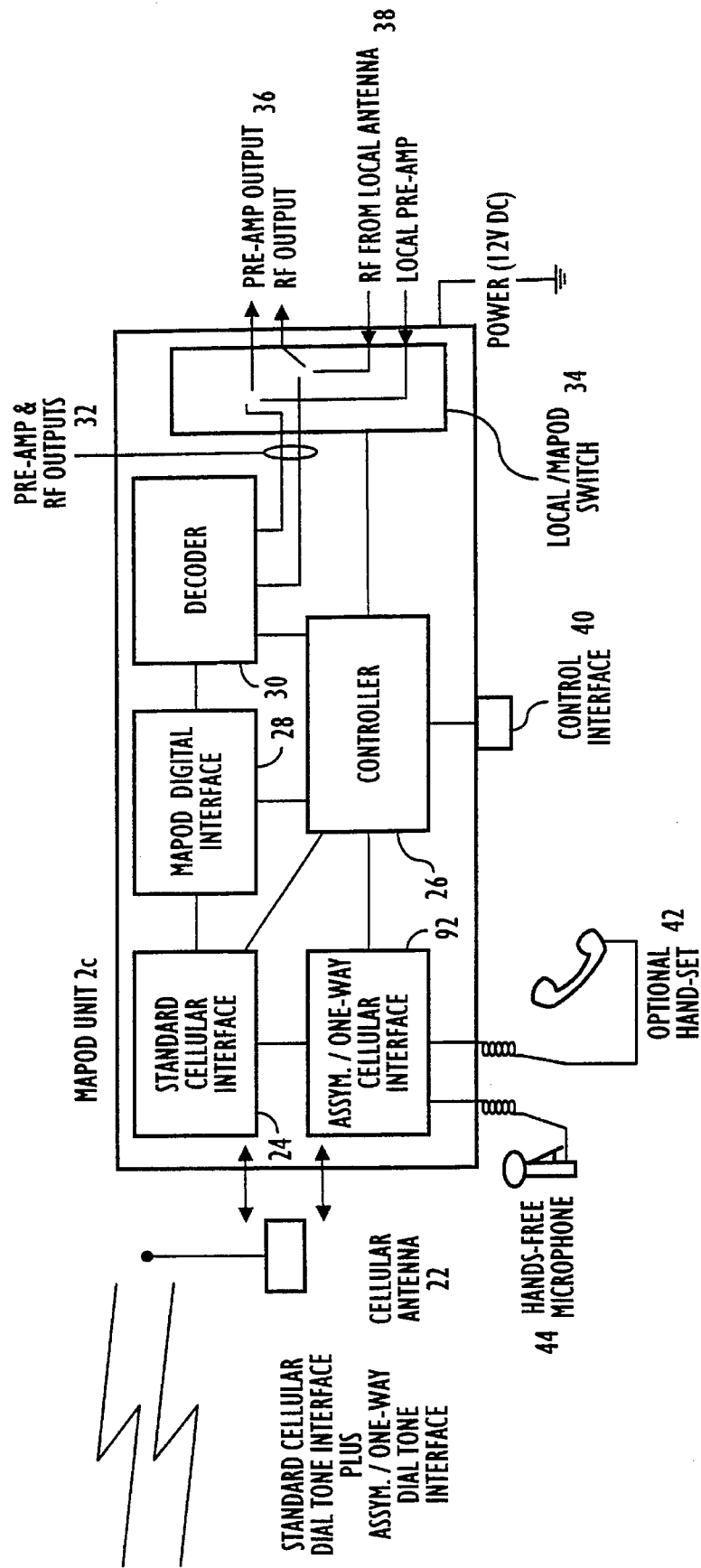
FIG. 6 is a block diagram of another embodiment of the mobile audio program selection device of the present invention.

FIG. 6 is a block diagram of another embodiment of the mobile audio program selection device. In FIG. 6, MAPOD unit 2c is substantially the same as MAPOD 2a illustrated in FIG. 2. However, MAPOD 2c further includes an asymmetrical one-way cellular interface 92 which is used for specifically receiving asymmetrical one way cellular audio data from an asymmetrical cellular network which is dedicated for the transmission of the audio data. In this situation, asymmetrical cellular interface 92 is able to receive the audio data at a much higher speed thereby further minimizing the connection time between MAPOD 2c and the cellular network which is transmitting the audio data. U.S. Pat. No. 5,247,347 is one example of an asymmetric connection between subscriber and application provider using standard asymmetrical digital subscriber line interface units over local lines, which is incorporated herein by reference.

In the previously described environment in connection with FIGS. 2 and 4–6, the MAPOD User Terminal would generally have the following capabilities:

(1) Cellular interface terminal
  (1a) standard (FIGS. 2 and 4), or
  (1b) two-line standard (FIG. 5), or
  (1c) standard plus asymmetrical/one-way downstream (FIG. 6)
(2) MAPOD digital interface to standard or optional one-way/asymmetrical cellular
(3) Compressed audio decoder (4) Local audio pass-through These capabilities are available to the user within the following operating modes:

(a) Telephone call only: (1a), (1b), or (1c)
(b) MAPOD only: (1a), (1b), or (1c); and (2)–(3)
(c) Telephone call and MAPOD: (1b) or (1c); and (2)–(3)
(d) Telephone call and local audio: (1a), (1b), or (1c); and (4)
(e) Off: (4)

The simplest situation involves a user terminal with (1a) type capability. The MAPOD application takes place over a standard cellular call. Operating modes (a), (b), (d) and (e) are possible. To access a MAPOD application, the user places a standard cellular call to the information provider and then negotiates service with the Application Gateway via the Speech Recognition Synthesized Audio Response (SR/SAR) unit. Once an application is selected, it is provided over the same call path.

With a type (1b) user terminal, operation is similar to the above except that operating mode(c) is now available due to the presence of a second line.

with a user terminal possessing type (1c) asymmetrical or one-way downstream capability, the application negotiation phase would take place over a standard cellular call. For low- or non-interactive applications, application delivery would take place over a one-way or asymmetrical cellular call (established by the Application Gateway), thus freeing up the standard cellular interface. All operating modes are possible.

A typical MAPOD session could operate as follows from the user's perspective:

1. A user is driving an automobile and has activated the MAPOD device.
2. The MAPOD device initiates a cellular call to the MAPOD server gateway Speech Recognition of Synthesized Audio Response (SR/SAR) unit.
3. The SR/SAR welcomes the user and provides an audio menu (e.g., music, library, etc.). This menu could be standard or pre-customized by the user. Also, the experienced user could interrupt the menu to move more quickly through the process.
4. The user makes a selection by speaking the desired item.
5. The SR/SAR continues to prompt the user with audio menus and interpreting the verbal response until a specific programming selection is made (e.g., Glen Miller medley). The gateway application then prompts the server to provide the requested programming.
6. The user may interpret programming delivery at any time with the appropriate verbal command or by terminating the session (i.e., hanging up). In order to prevent an inadvertent interruption, the user could activate a switch on the MAPOD device to temporarily disable voice command transmission.)

Since the MAPOD delivery system is not limited by economics to programming formats with mass appeal as with broadcast radio, there is the potential to satisfy the needs of many more users who may desire programming alternatives. The proposed system could provide individual users with access to large programming libraries.

Figure 7:
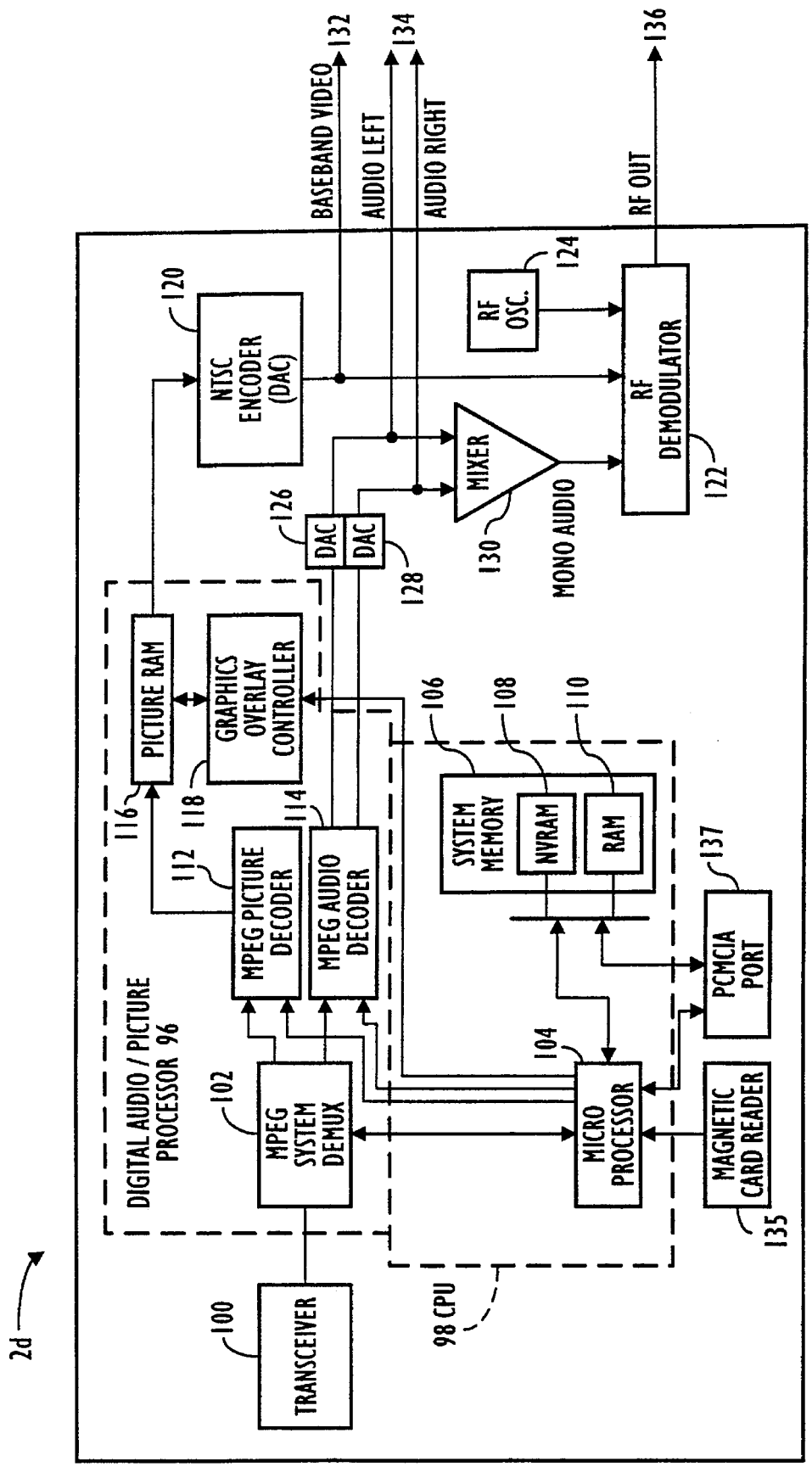
FIG. 7 is a block diagram of another embodiment of the mobile audio program selection device of the present invention.

FIG. 7 is a block diagram of another embodiment of the mobile audio program selection device having the ability to present a limited amount of graphical information to the user. In FIG. 7, MAPOD 2d may connect or interface with a number of different types of application provider networks, such as described in commonly assigned application Ser. No. 08/250,792, filed May 27, 1994, entitled "Full Service Network" (attorney docket no. 680-080), and commonly assigned application Ser. No. 08/250,791, filed May 27, 1994, entitled "Dynamically Programmable Digital Entertainment Terminal" (attorney docket no. 680-083), the disclosures of which are incorporated herein entirely by reference.

For each different type of network, MAPOD 2d includes transceiver 100 providing the actual physical connection to the particular type of network. Transceiver 100 will also perform any format conversion necessary between signal formats utilized by the network and signal formats used within MAPOD 2d. Transceiver 100 also provides two-way signal conversion and formatting, for example, for a control signaling channel and other standard cellular protocol described previously.

In the illustrated embodiment, transceiver 100 presents two connections to the rest of MAPOD 2d, a high bit rate broadband connection and a low bit rate signaling connection. The broadband connection is a one-way downstream only connection, but the low-bit rate signaling connection is a two-way connection.

Transceiver 100 may take the form of a plug in module. In the preferred embodiment, transceiver 100 would be similar to a daughter board or option card which can be plugged into a back plane of a personal computer (PC). In such an embodiment, typically a technician could replace the module in either the field or the shop, to modify transceiver 100 to connect to and communicate over a different network, and the technician would modify associated communications control software in the system memory. Alternative implementations may use a user replaceable cartridge type network interface module, similar to a video game cartridge, which may include memory in the module for storage of the communications control. As a further alternative, the network interface module could include a digital signal processor controlled by the CPU of the transceiver 100, and input/output connections compatible with all of the digital broadband networks currently available. The downloaded operating system software stored in the system memory of the transceiver would control operations of the digital signal processor to send and receive signals in accord with the particular network the subscriber chooses to connect with transceiver 100.

MAPOD 2d includes CPU 98, comprising, for example, a 386 or 486 microprocessor 104 and associated system memory 106. The system memory 106 preferably includes at least 2 Mbytes of volatile dynamic RAM 110 and 1 Mbyte of non-volatile RAM 108. The microprocessor 104 also includes a small amount of ROM (not shown) storing "loader" programming needed to control "wake-up" after the power is turned "on". An EPROM memory (not shown) also may be added.

A digital audio/picture signal processor 96, controlled by the CPU 98, produces digital uncompressed audio and picture or graphical signals from the audio and picture MPEG encoded packets received from the network through transceiver 100. The audio/picture processor 96 includes an MPEG system demultiplexer 102, an MPEG picture decoder 112, an MPEG audio decoder 114, a graphics overlay controller 118 and at least two frames (e.g. 8 Mbytes) of picture RAM 116.

The MPEG system demultiplexer circuitry 102 recognizes packets in the MPEG data stream received over the broadband channel through transceiver 100, and routes the packets to the appropriate components of MAPOD 2d. For example, the MPEG system demultiplexer 102 circuitry recognizes audio and picture packets in the MPEG data stream and routes those packets to the decoders 114 and 112, respectively.

The MPEG picture decoder 112 decompresses received picture or graphical packet signals to produce a digital signal, and the MPEG audio decoder 114 decompresses received audio packets to produce left and right digitized stereo signals. For at least some functions, the MPEG decoders 112, 114 may be controlled in response to signals from the microprocessor 104. The MPEG picture decoder 112 will internally include at least two frames (e.g. 8 Mbytes) of RAM (not separately shown) for use as a frame reorder buffer during the MPEG decoding process, and the MPEG audio decoder 114 also may include some buffer memory.

The picture RAM 135 is preferably a standard digital data RAM, of appropriate size, which is used in MAPOD 2d to store digitized frames of video data. The RAM within the MPEG picture decoder 112 likewise consists of standard digital data RAM.

The graphics overlay controller 118 produces displays of text and graphics data, such as the initial turn-on selection menu received over the signaling channel, in response to instructions from the CPU 98. The picture RAM 116 sequentially receives each frame of digitized, uncompressed video information, as output from the MPEG picture decoder 112. The picture RAM 116 also receives digital information and read/write control signals from the graphics overlay controller 118 representing the several planes of text and graphics information and combines that information with the frames of decompressed picture to produce composite picture frames.

The graphics overlay controller 118 and the picture RAM 116 cooperate to manipulate, for example, five different planes of video information, four of which may be active at any one time, to produce the composite picture frame output signals. The individual planes comprise the decoded MPEG picture frames, a cursor, two graphics/text image planes manipulated by the microprocessor 104 and a backdrop plane. The backdrop plane would be switched in to replace the plane representing the decoded MPEG picture frames, e.g. to present a blue background instead of the MPEG picture background.

When there are no graphics or text, the composite frames would correspond entirely to the uncompressed received picture frames output by the MPEG picture decoder 112. When no received picture frames are to be output, either when none are received or when they are to be entirely replaced, the information from the graphics overlay controller 118 specifies a background and the active planes of text or graphic information. When received picture frames are combined with text and/or graphics, the composite picture frames include the uncompressed received picture frames with selected pixels thereof replaced with graphics or textual data display pixels specified by the graphics overlay controller 118. In this last situation, the graphics overlay controller 118 would deactivate the backdrop plane.

MAPOD 2d also includes audio and picture digital to analog converters and appropriate drivers to produce output signals compatible with a conventional television set or monitor. Specifically, the converter and driver circuitry of MAPOD 2d includes audio digital to analog converters (DAC) 126, 128, an audio mixer 130, an NTSC encoder 120, and an RF (radio frequency) demodulator 122.

The DAC's 126 and 128 receive the uncompressed left and right digitized audio signals output by the MPEG audio decoder 114. In response, the DAC's 126 and 128 produce baseband analog audio signals for output to individual baseband output terminals. The audio mixer 130 also receives the baseband audio signals from the DAC's 126 and 128. The mixer 130 combines the left and right analog audio signals to produce a monaural audio signal as the audio input to demodulator 122 which is synchronized via RF oscillator 124.

The NTSC encoder 120 also performs a digital to analog converter (DAC) function. In response to the digitized picture signals received from the picture RAM 116, the NTSC encoder 120 produces a baseband analog signal in standard NTSC format. The baseband NTSC signal is supplied to an output terminal 132 of MAPOD 2d. The baseband NTSC video signal is also supplied to the RF demodulator 122. The RF demodulator 122 responds to the mono audio signal, the NTSC signal and an RF signal from a local RF oscillator 124, to produce a standard RF television signal on an available TV channel, typically channel 3 or channel 4.

The type of connection of MAPOD 2d to the television set or monitor depends on the capabilities of the user's television set. If the user has a monitor type television capable of receiving baseband picture and stereo audio inputs, the appropriate terminals of the television would connect directly to the picture and audio output terminals 132 and 134 of MAPOD 2d. If the subscriber does not have such a television monitor, then the RF output of the demodulator 122 would be connected to the cable or antenna input connection of the television, e.g. by coaxial cable via RF output 136. Alternatively, the digitized picture and audio may go to separate output terminals (not shown) for connection to inputs of digital display devices, for example, for high definition television (HDTV) sets.

MAPOD 2d is an open interface device in that it interacts with equipment of a large number of program providers to offer users a wide array of principally audio programming for the mobile user. MAPOD 2d is preferably a programmable device to which different individual program providers can download application software, and at least one program provider can download all or a part of the operating system. In non-volatile memory (ROM and non-volatile RAM), MAPOD 2d will store a loader program and an operating system. The loader program and operating system in the ROM and the non-volatile RAM will include sufficient programming to control initial communications and define interfaces and drivers.

MAPOD 2d also includes a magnetic card reader 135 connected to the microprocessor 104. This reader 135 could be used to scan credit card information encoded on magnetic strips on commonly available credit cards for purchasing audio programming. In a home shopping and purchasing audio service, controlled by the downloaded software, the user would scan their own credit card through the magnetic card reader 135 as part of the payment operations. The reader could also have magnetic write capabilities to perform debit card operations.

MAPOD 2d further includes a personal computer memory-card interface adapter (PCMCIA) port 137. This is a two-way interface for connection to and communication with a flash memory module, such as is now incorporated into advanced "smart card" devices. A user might communicate with an auxiliary database connected via PCMCIA port 137 and a broadband network. For example, the user's personal information could be read from the smart card and subsequently updated on the smart card, through the PCMCIA port 137. Another use of this port might involve communication to another system to download information. Although specified as a "memory" port and mapped by the CPU as part of its system memory space, the devices connected to this port 137 can have other data processing capabilities, e.g. buffering and modem communication capability.

In the current implementation, the PCMCIA port 137 will carry 6 Mbits/s of data, but the port can be designed for higher speeds such as 20 Mbytes/s. Another use of this port would be for connection to an Ethernet card or other Local Area Network (LAN) card to permit data communications between MAPOD 2d and one or more computers. MAPOD 2d would provide the computers with communication services through the broadband network, for example to receive high speed downloads of new or updated software for those computers.

Figure 8:
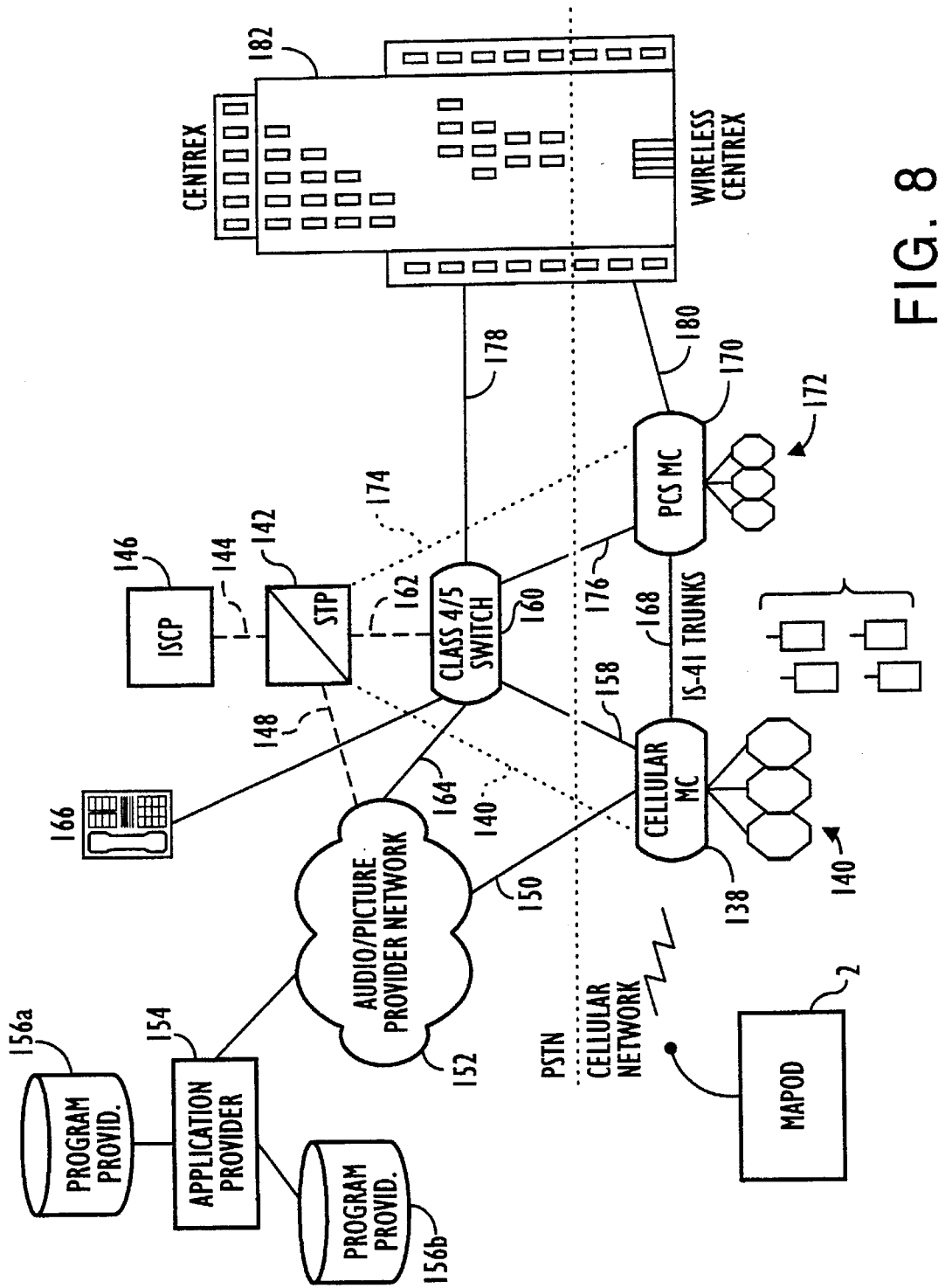
FIG. 8 is a diagram of another embodiment of the mobile audio program selection system of the present invention.

FIG. 8 is a diagram of another embodiment of the mobile audio program selection system used in connection with an Advanced Intelligent Network (AIN) type architecture. In FIG. 8, one or more central office switches, such as the class 4/5 Switch 160, are located throughout a state or region served by a telephone operating company (TELCO). Local telephone lines connect the central office switch 160 to individual telephone terminals in each geographic area, for example to the Plain Old Telephone Service (POTS) phone 166.

Although shown as telephones in FIG. 8, the terminals can comprise any communication device compatible with the line. In addition, wireless communication services are provided via radio links using frequencies assigned to cellular communications networks. Other types of wireless communication, however, could be substituted for the radio communication systems. For example, the invention could use a series of radio relay transponders, an infrared system or a satellite based system to provide one or more of the wireless links.

Switch 160 connects via trunk circuits 158, 176 to one or more Mobility Controllers (MC's), such as the Cellular MC 138 and the Personal Communication Service (PCS) MC 170. Each central office my also connect via trunk circuits to one or more remote central offices. The trunk circuits carry large numbers of telephone calls between central offices and/or between a central office and the mobility controllers. Also, each central office has a Common Channel Inter-office Signalling (CCIS) type data link 125 going to a Signalling Transfer Point (STP) 142. CCIS type data links 140 and 174 provide data communication for PCS and related special service processing between the MC's 138, 170 and the STP 142. Also, a CCIS packet switched data link 144 connects the STP 142 to an Integrated Serves Control Point (ISCP) 146.

Each MC connects to antennas for a number of cell cites to provide wireless communication services to PCS portable handsets and/or other wireless mobile communication devices including MAPOD 2 discussed in detail below. In the example shown, Cellular MC 138 controls communications via a number of macrocells 140. PCS MC 170 controls communications via a number of microcells 172. The MC's 138, 170 are also interconnected with each other by IS-41 data trunks 168, and may be interconnected via voice trunks (not separately shown) essentially running in parallel with the IS-41 trunks 168.

MAPOD 2 interfaces with cellular mobility controllers 138 and 170 for ordering and receiving audio programming from an application provider. Cellular mobility controllers 138 is connected to audio/picture provider network 152 via IS-41 data trunk line 150. In addition, cellular mobility controller 170 is connected to audio/picture provider network 152 via IS-41 data trunk 176, switch 160 and IS-41 data trunk line 164. Alternatively, mobility controller 170 may be directly connected to audio/picture provider network 152. Audio/picture provider network 152 may also be connected to STP 142 via CCIS type data link 148 to permit some limited control exercised by ISCP 146. Audio/picture provider network 152 retrieves the audio selection from the appropriate application provider 154 and program provider 156a, 156b.

Additionally, to provide land line type centrex services for a business customer, the switch 160 provides a land line connection 178 to the customer's premises 182. The land line link would actually include a number of telephone lines connected to various types of conventional telephone terminal devices. To provide wireless centrex services to a particular location, which may be the same customer premises 182, lines 180 connect the PCS MC 170 to macrocell antennae within the customer's building. Although shown as a single building, the integrated Centrex could cover a broader area, for example an entire college campus.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A radio frequency based information distribution system having mobile users, comprising:
   a mobile switching office selectively connecting the mobile users of the information distribution system;
   information service providers, operatively connected to said mobile switching office, at least one of the information service providers receiving user selection signal inputs received by said mobile switching office from a mobile user, and transmitting user selected information to the mobile switching office responsive to the user selection signal inputs; and at least one mobile terminal, comprising:
      a receiver, operatively coupling the at least one mobile terminal to the mobile switching office, receiving the user selected information from the at least one of the information service providers via said mobile switching office;
      a control processor controlling operations of the at least one mobile terminal;
      means for receiving a user selection from the mobile user, for generating user selection signal inputs responsive to the user selection, and for transmitting the user selection signal inputs to the mobile switching office;
      signal format means for formatting the user selected information for broadcasting, and for outputting formatted user selected information; and
      broadcast means for broadcasting the formatted user selected information,
   wherein the user selection comprises an audio selection,
   wherein the at least one of the information service providers include:
      programming servers storing programs;
      speech recognition means for receiving the audio selection via said mobile switching office, and for generating data selection signals; and
      a gateway for receiving the data selection signals from said speech recognition means, said gateway selecting at least one of the programs stored in at least one of the programming servers responsive to the data selection signals,
   wherein said at least one mobile terminal further comprises a memory operatively connected to said receiver, and
   wherein said receiver receives the at least one of the programs corresponding to the data selection signals and stores the at least one of the programs entirely in said memory before broadcasting to the mobile user, thereby minimizing connection between said at least one mobile terminal and said mobile switching office.

2. A radio frequency based information distribution system as in claim 1,
   wherein the at least one of the information service providers further includes audio menu means for presenting program selections audibly to the mobile user, and
   wherein the mobile user selects at least one of the program selections using the audio selection.

3. A radio frequency based information distribution system as in claim 2,
   wherein said at least one mobile terminal further includes a picture display,
   wherein the at least one of the information service providers further includes picture transmitting means for presenting picture program selections visually to the mobile user while substantially simultaneously presenting the program selections audibly to the mobile user, and
   wherein the mobile user selects the at least one of the program selections using the audio selection responsive to the program selections presented audibly and the picture program selections presented visually.

4. A radio frequency based information distribution system as in claim 1, wherein said receiver comprises two-line receiver means for receiving the user selected information from the at least one of the information service providers via said mobile switching office using one of two communication channels, and for receiving a voice telephone call for connection with the mobile user.

5. A radio frequency based information distribution system as in claim 1,
   wherein said means for receiving a user selection transmits the user selection signal inputs to the mobile switching office using a first communication channel which operates using a first communication speed, and
   wherein said receiver receives the at least one of the programs corresponding to the data selection signals and stores the at least one of the programs entirely in said memory using a second communication channel which operates using a second communication speed substantially greater than the first communication speed of the first communications channel.

6. A radio frequency based information distribution system as in claim 1,
   wherein the radio frequency based information distribution system further comprises:
      cellular equipment transmitting and receiving cellular calls for voice connection; and
      switching means for selectively switching between said cellular equipment and said at least one mobile terminal, and
   wherein said control processor monitors the activity of said cellular equipment and said at least one mobile terminal for selective transmission and reception between said mobile switching office and either said at least one mobile terminal or said cellular equipment.

7. A radio frequency based information distribution system as in claim 6, wherein when said control processor determines that both said cellular equipment and said at least one mobile terminal are active, said control processor controls transmission and reception between said mobile switching office and said at least one mobile terminal, denying transmission and reception access to said cellular equipment.

8. A radio frequency based information distribution system as in claim 1,
wherein the radio frequency based information distribution system further comprises:
auxiliary audio means for receiving auxiliary audio signals from an audio source;
auxiliary broadcast means for broadcasting at least one of the auxiliary audio signals and the user selected information; and
switching means for selectively switching between said auxiliary broadcast means and either said auxiliary audio means or said at least one mobile terminal.

9. A radio frequency based information distribution system as in claim 8, wherein when said control processor determines that both said auxiliary audio means and said at least one mobile terminal are active, said control processor controls switching between said auxiliary broadcast means and said at least one mobile terminal, denying transmission and reception access to said auxiliary audio means.

10. An asymmetrical audio program delivery cellular system having mobile users, comprising:
at least one mobile terminal, comprising:
a receiver receiving user selected program data signals for broadcasting to a mobile user;
a control processor controlling operations of the at least one mobile terminal;
means for receiving a user selection from the mobile user, for generating user selection signal inputs responsive to the user selection, and for transmitting the user selection signal inputs;
signal format means for formatting the user selected information for broadcasting, and for outputting formatted user selected information; and
broadcast means for broadcasting the formatted user selected information;
a first mobile switching office receiving the formatted user selected information broadcast by said broadcast means using a first communication channel which operates under a first communication speed;
information service providers, operatively connected to said first mobile switching office, at least one of the information service providers receiving user selection signal inputs received by said first mobile switching office from the mobile user, and transmitting at least one user selected program responsive to the user selection signal inputs; and
a second mobile switching office, operatively connected to said at least one of the information service providers, devoted to receiving the at least one user selected program transmitted by said at least one of the information service providers using a second communication channel which operates under a second communication speed, and devoted to transmitting the at least one user selected program to said at least one mobile terminal,
wherein the second communication speed of the second communications channel of said second mobile switching office is substantially greater than the first communication speed of the first communications channel of said second mobile switching office.

11. A radio frequency based information distribution system as in claim 10,
wherein the user selection comprises an audio selection, and
wherein the at least one of the information service providers includes:
programming servers storing programs;
speech recognition means for receiving the audio selection via said mobile switching office, and for generating data selection signals; and
a gateway for receiving the data selection signals from said speech recognition means, said gateway selecting at least one of the programs stored in at least one of the programming servers responsive to the data selection signals.

12. A radio frequency based information distribution system as in claim 11,
wherein the at least one of the information service providers further includes audio menu means for presenting program selections audibly to the mobile user, and
wherein the mobile user selects at least one of the program selections using the audio selection.

13. A radio frequency based information distribution system as in claim 12,
wherein said at least one mobile terminal further includes a picture display,
wherein the at least one of the information service providers further includes picture transmitting means for presenting picture program selections visually to the mobile user while substantially simultaneously presenting the program selections audibly to the mobile user, and
wherein the mobile user selects the at least one of the program selections using the audio selection responsive to the program selections presented audibly and the picture program selections presented visually.

14. An audio program and voice mail download distribution system having mobile users, comprising:
a mobile switching office selectively connecting the mobile users of the audio program and voice mail download system;
information service providers, operatively connected to said mobile switching office, at least one of the information service providers receiving user selection signal inputs received by said mobile switching office from a mobile user, and transmitting user selected information to the mobile switching office responsive to the user selection signal inputs; and
at least one mobile terminal, comprising:
a receiver, operatively coupling the at least one mobile terminal to the mobile switching office, receiving the user selected information from the at least one of the information service providers via said mobile switching office;
a control processor controlling operations of the at least one mobile terminal;
means for receiving a user selection from the mobile user, for generating user selection signal inputs responsive to the user selection, and for transmitting the user selection signal inputs to the mobile switching office;

signal format means for formatting the user selected information for broadcasting, and for outputting formatted user selected information;

broadcast means for broadcasting the formatted user selected information; and a memory operatively connected to said receiver, and wherein the user selected information comprises at least one of voice mail messages and audio programs, and wherein said receiver receives the user selected information corresponding to the user selection signal inputs and stores the user selected information entirely in said memory before broadcasting to the mobile user, thereby minimizing connection between said at least one mobile terminal and said mobile switching office.

15. A radio frequency based information distribution system as in claim 14, wherein the at least one of the information service providers further includes audio menu means for presenting program selections audibly to the mobile user, and wherein the mobile user selects at least one of the program selections using the audio selection.

16. An advanced intelligent network based information distribution system having mobile users, comprising:

a central office switching system connected to communication lines including at least one service switching point for selectively providing switched communications between the communication lines;

a mobility controller, connected to said central office switching system, arranged for selectively providing wireless communications between said central office switching system and mobile terminals by using control data conveyed to at least one service switching point through a service transfer point;

a network controller arranged for selectively providing control data to effect land line communications, and arranged separately from the central office switching system and the mobility controller, said network controller being connected to both said mobility controller and said at least one service switching point through at least one service transfer point arranged to convey control data to effect communications, said network controller storing preprogrammed call processing data associated with subscribers who are associated with one of the communication lines connected to the central office switching system and said network controller further storing preprogrammed call processing data associated with subscribers who are associated with one of the mobile terminals;

information service providers, operatively connected to said mobility controller, at least one of the information service providers receiving user selection signal inputs received by said mobility controller from a mobile user, and transmitting user selected information to said mobility controller responsive to the user selection signal inputs; and at least one mobile terminal, comprising:

a receiver, operatively coupling the at least one mobile terminal to said mobility controller, receiving the user selected information from the at least one of the information service providers via said mobility controller;

a control processor controlling operations of the at least one mobile terminal;

means for receiving a user selection from the mobile user, for generating user selection signal inputs responsive to the user selection, and for transmitting the user selection signal inputs to said mobility controller;

signal format means for formatting the user selected information for broadcasting, and for outputting formatted user selected information; and broadcast means for broadcasting the formatted user selected information.

17. An advanced intelligent network based information distribution system as in claim 16, wherein call processing by both the central office switching system and the mobility controller to establish a completed communication link between one of the communication lines and the at least one of the mobile terminals is controlled in response to the stored preprogrammed call processing data associated with at least one of the subscribers and transmitted through said service transfer point.

18. An advanced intelligent network based information distribution system as in claim 17, wherein call processing by said information service providers is controlled in response to the stored preprogrammed call processing data associated with at least one of the subscribers and transmitted through said service transfer point.

19. In a radio frequency based information distribution system having mobile users, comprising a mobile switching office selectively connecting the mobile users of the information distribution system, information service providers, operatively connected to said mobile switching office, at least one of the information service providers transmitting user selected information to the mobile switching office responsive to user selection signal inputs, and at least one mobile terminal including a receiver, operatively coupling the at least one mobile terminal to the mobile switching office, a control processor controlling operations of the at least one mobile terminal, means for receiving a user selection from the mobile user, signal format means for formatting the user selection for broadcasting, and broadcast means for broadcasting the formatted user selected information, a method of distributing radio frequencies to mobile users, said method comprising the steps of:

(a) selectively connecting the mobile users of the information distribution system;

(b) receiving a user selection from at least one of the mobile users, (c) generating user selection signal inputs responsive to the user selection, (d) transmitting the user selection signal inputs to the mobile switching office;

(e) receiving user selection signal inputs received by the mobile switching office from the at least one of the mobile users, and transmitting a user selected program to the mobile switching office responsive to the user selection signal inputs via at least one of the information service providers;

(f) receiving the user selected program from the at least one of the information service providers via the mobile switching office in a receiver of the at least one mobile terminal, and storing the user selected program in its entirety in the at least one mobile terminal prior to broadcasting same to the mobile user;

(g) controlling operations of the at least one mobile terminal;

(h) formatting the user selected program for broadcasting; and (i) broadcasting the formatted user selected program to the mobile user of the at least one mobile terminal.

20. An audio program and voice mail download distribution system having mobile users, comprising:
- a mobile switching office selectively connecting the mobile users of the audio program and voice mail download system;
- information service providers, operatively connected to said mobile switching office, at least one of the information service providers receiving user selection signal inputs received by said mobile switching office from a mobile user, and transmitting a user selected program to the mobile switching office responsive to the user selection signal inputs; and
- at least one mobile terminal, comprising:
  - a receiver, operatively coupling the at least one mobile terminal to the mobile switching office, receiving the user selected program from the at least one of the information service providers via said mobile switching office;
  - a control processor controlling operations of the at least one mobile terminal;
  - means for receiving a user selection from the mobile user, for generating user selection signal inputs responsive to the user selection, and for transmitting the user selection signal inputs to the mobile switching office;
  - signal format means for formatting the user selected program for broadcasting, and for outputting a formatted user selected program;
  - broadcast means for broadcasting the formatted user selected program; and
  - a memory operatively connected to said receiver, and wherein said receiver receives the user selected program corresponding to the user selection signal inputs and stores the user selected program entirely in said memory before broadcasting to the mobile user.

21. An advanced intelligent network based information distribution system having mobile users, comprising:
- a central office switching system connected to communication lines including at least one service switching point for selectively providing switched communications between the communication lines;
- a mobility controller, connected to said central office switching system, arranged for selectively providing wireless communications between said central office switching system and mobile terminals by using control data conveyed to at least one service switching point through a service transfer point;
- a network controller connected to both said mobility controller and said at least one service switching point arranged to convey control data to effect communications, said network controller storing preprogrammed call processing data associated with subscribers who are associated with one of the communication lines connected to the central office switching system;
- information service providers, operatively connected to said mobility controller, at least one of the information service providers receiving user selection signal inputs received by said mobility controller from a mobile user, and transmitting user selected information to said mobility controller responsive to the user selection signal inputs; and
- at least one mobile terminal, comprising:
  - a receiver, operatively coupling the at least one mobile terminal to said mobility controller, receiving the user selected information from the at least one of the information service providers via said mobility controller;
  - a control processor controlling operations of the at least one mobile terminal;
  - means for receiving a user selection from the mobile user, for generating user selection signal inputs responsive to the user selection, and for transmitting the user selection signal inputs to said mobility controller;
  - signal format means for formatting the user selected information for broadcasting, and for outputting formatted user selected information; and
  - broadcast means for broadcasting the formatted user selected information.

22. An asymmetrical audio program delivery cellular system having mobile users, comprising:
- at least one mobile terminal, comprising:
  - a receiver receiving user selected program data signals for broadcasting to a mobile user;
  - a control processor controlling operations of the at least one mobile terminal;
  - means for receiving a user selection from the mobile user, for generating user selection signal inputs responsive to the user selection, and for transmitting the user selection signal inputs;
  - signal format means for formatting the user selected information for broadcasting, and for outputting formatted user selected information; and
  - broadcast means for broadcasting the formatted user selected information;
- a first mobile switching office receiving the formatted user selected information broadcast by said broadcast means;
- information service providers, operatively connected to said first mobile switching office, at least one of the information service providers receiving user selection signal inputs received by said first mobile switching office from the mobile user, and transmitting at least one user selected program responsive to the user selection signal inputs; and
- a second mobile switching office, operatively connected to said at least one of the information service providers, devoted to receiving the at least one user selected program transmitted by said at least one of the information service providers, and devoted to transmitting the at least one user selected program to said at least one mobile terminal.

* * * * *